US009902805B2

(12) United States Patent
Jansen et al.

(10) Patent No.: US 9,902,805 B2
(45) Date of Patent: Feb. 27, 2018

(54) UNSATURATED POLYESTER RESIN COMPOSITIONS

(71) Applicant: DSM IP ASSETS B.V., Heerlen (NL)

(72) Inventors: Johan Jansen, Geleen (NL); Ronald Ivo Kraeger, Baarn (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 15/213,313

(22) Filed: Jul. 18, 2016

(65) Prior Publication Data

US 2016/0326310 A1 Nov. 10, 2016

Related U.S. Application Data

(60) Continuation of application No. 13/968,121, filed on Aug. 15, 2013, now abandoned, which is a division of application No. 12/739,898, filed as application No. PCT/EP2008/064265 on Oct. 22, 2008, now abandoned.

(30) Foreign Application Priority Data

Oct. 25, 2007 (EP) .................... 07020905

(51) Int. Cl.
| | |
|---|---|
| C08L 25/06 | (2006.01) |
| C08G 63/91 | (2006.01) |
| C08F 283/01 | (2006.01) |
| C08K 5/098 | (2006.01) |
| C08K 5/3445 | (2006.01) |

(52) U.S. Cl.
CPC .......... *C08G 63/916* (2013.01); *C08F 283/01* (2013.01); *C08K 5/098* (2013.01); *C08K 5/3445* (2013.01); *C08L 25/06* (2013.01)

(58) Field of Classification Search
None
See application file for complete search history.

(56) References Cited

U.S. PATENT DOCUMENTS

| | | | |
|---|---|---|---|
| 4,309,511 A | 1/1982 | Jefferson et al. | |
| 5,082,598 A | 1/1992 | Awaji et al. | |
| 6,329,475 B1 * | 12/2001 | Kelly .................... | C08F 283/01 523/442 |

FOREIGN PATENT DOCUMENTS

| | | |
|---|---|---|
| GB | 834286 | 5/1960 |
| JP | 50-12182 | 2/1975 |
| PL | 181 434 | 7/2001 |
| WO | 2005/078020 | 8/2005 |
| WO | 2006/131295 | 12/2006 |

OTHER PUBLICATIONS

International Search Report for PCT/EP2008/064265, dated Jan. 20, 2009.
Database CA [online] Chemical Abstracts service, Columbus, OH, US, Takeshita, Yasuhiro et al., "Hardening Unsaturated Polyesters", XP002461379 (1984).
Database CA [online] Chemical Abstracts service, Columbus, OH, US, Groszek, Grazyna et al., "Manufacture of Preaccelerated unsaturated Polyester Resin Compositions with Improved Storage Stability", XP002461836 (2002).
Li, Ling and Lee, L. James: "Effects of a Chelating Agen -2,4-Pemtadione on Low Temerature Composite Molding of Vinyl Ester and Unsaturated Polyester Resins", Plymer Vomposites, vol. 23, No. 6, Dec. 2002, pp. 971-990, XP002461908.
Written Opinion of the International Searching Authority for PCT/EP2008/064265, dated Jan. 20, 2009.
Polyester Resins, Netcomposites Webpage, pp. 1-2 (2012).

* cited by examiner

*Primary Examiner* — Robert C Boyle
(74) *Attorney, Agent, or Firm* — Nixon & Vanderhye P.C.

(57) ABSTRACT

The present invention relates to a pre-accelerated resin composition, characterized in that the resin composition comprises an unsaturated polyester resin and/or a vinyl ester resin, a soluble copper compound and a heterocyclic aromatic amine and which resin composition is essentially free of cobalt. The present invention further relates to a two component composition in which the first component comprises such a resin composition and in which the second component comprises an organic peroxide.

17 Claims, No Drawings

UNSATURATED POLYESTER RESIN COMPOSITIONS

This application is a continuation of commonly owned U.S. application Ser. No. 13/968,121, filed Aug. 15, 2013 (now abandoned), which is a divisional of Ser. No. 12/739,898, filed Sep. 1, 2010 (now abandoned), which is the national phase application under 35 USC § 371 of PCT/EP2008/064265, filed Oct. 22, 2008, which designated the US and claims benefit of EP Patent Application No. 07020905.1, filed Oct. 25, 2007, the entire contents of each of which are hereby incorporated by reference.

The invention relates to a pre-accelerated resin composition comprising an unsaturated polyester resin and/or a vinyl ester resin. The present invention also relates to two-component compositions containing a first component A and a second component B; the first component containing an unsaturated polyester resin and/or a vinyl ester resin and the second component containing a peroxide. In particular, the present invention relates to two-component unsaturated polyester resin or vinyl ester resin compositions for structural parts.

The present invention further also relates to objects and structural parts prepared from such two-component compositions. The present invention finally also relates to a process for curing such two-component compositions.

As used herein, the term "two-component system" refers to systems where two separate components (A and B) are being spatially separated from each other, for instance in separate cartridges or the like, and is intended to include any system wherein each of such two separate components (A and B) may contain further separate components. The components are combined at the time the system is used.

As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc.

All polyester resins, by their nature, undergo some changes over time from their production till their actual curing. One of the characteristics where such changes become visible is the gel-time drift. The state of the art unsaturated polyester resin systems generally are being cured by means of initiation systems. In general, such unsaturated polyester resin systems are cured under the influence of peroxides and are accelerated (often even pre-accelerated) by the presence of metal compounds, especially cobalt salts, as accelerators. Cobalt naphthenate and cobalt octanoate are the most widely used accelerators. In addition to accelerators, the polyester resins usually also contain inhibitors for ensuring that the resin systems do not gellify prematurely (i.e. that they have a good storage stability). Furthermore, inhibitors, especially phenolic inhibitors, are being used to ensure that the resin systems have an appropriate gel time and/or for adjusting the gel-time value of the resin system to an even more suitable value.

Most commonly, in the state of the art, polymerization initiation of unsaturated polyester resins, etc. by redox reactions involving peroxides, is accelerated or pre-accelerated by a cobalt compound in combination with another accelerator.

It has now surprisingly been found that a soluble copper compound in combination with a heterocyclic aromatic amine acts as an accelerator for the peroxide curing of an unsaturated polyester resin and/or vinyl ester resin. The resin composition contains less than 0.01 mmol cobalt per kg primary resin system. Preferably, the resin composition contains less than 0.001 mmol Co per kg primary resin system. Most preferably the resin composition is free of cobalt.

According to the present invention, compositions having good curing properties can be obtained, i.e. the compositions according to the invention have short gel time, short peak time and/or high peak temperature. In the curing of unsaturated polyester resins or vinyl esters, gel time is a very important characteristic of the curing properties. In addition also the time from reaching the gel time to reaching peak temperature, and the level of the peak temperature (higher peak temperature generally results in better curing) are important. In addition, the compositions according to the present invention can be obtained with reduced gel-time drift tendency.

U.S. Pat. No. 4,524,177 discloses that copper compounds in an amounts from 0.0005 to 0.2% by weight, preferably from 0.001 to 0.05% by weight, based on the ethylenically unsaturated compound to be polymerized, can be used for basic stabilization of the ethylenically unsaturated compounds to be polymerized. Thus, this document teaches that copper is an inhibitor. Similar, GB834286 teaches that small amounts of a soluble form of copper in the range 0.25 ppm to 10 ppm of copper improves the inhibiting properties of inter alias aromatic amines, quaternary ammonium salts and amine salts. U.S. Pat. No. 6,329,475 furthermore teaches that an amine acts as an inhibitor for catalyst composition containing copper. WO-A-9012824 discloses an accelerator composition for the curing of unsaturated polyester resins comprising a complex of certain metal salts with organic nitrogen compounds. Preferably, the metal is selected from copper, vanadium, lithium, nickel, iron, magnesium and cobalt. For copper, an amount of from 0.1 to 10 ppm is mentioned. Furthermore, according to this document, higher amounts of copper do not further contribute to the activity. However, none of the documents cited above disclose that copper in combination with a heterocyclic aromatic amine can be used as accelerator for the radical curing of unsaturated polyesters or vinyl esters.

An additional advantage of the present invention is that compositions with relatively low gel-time drift tendency can be obtained.

As meant herein the term gel-time drift (for a specifically selected period of time, for instance 30 or 60 days) reflects the phenomenon, that—when curing is performed at another point of time than at the reference standard moment for curing, for instance 24 hours after preparation of the resin—the gel time observed is different from that at the point of reference. For unsaturated polyester resins, as can generally be cured under the influence of peroxides, gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known. The lower the gel-time drift is, the better predictable the behavior of the resin (and the resulting properties of the cured material) will be.

W. D. Cook et al. in Polym. Int. Vol. 50, 2001, at pages 129-134 describe in an interesting article various aspects of control of gel time and exotherm behavior during cure of unsaturated polyester resins. They also demonstrate how the exotherm behavior during cure of such resins can be followed. FIGS. 2 and 3 of this article show the gel times in the bottom parts of the exotherms measured. Because these authors focus on the exotherms as a whole, they also introduced some correction of the exotherms for heat loss. As can be seen from the figures, however, such correction for heat loss is not relevant for gel times below 100 minutes.

Gel time drift (hereinafter: "Gtd") can be expressed in a formula as follows:

$$\text{Gtd} = (T_{25 \to 35^\circ C. \text{ at } y\text{-days}} - T_{25\text{-}35^\circ C. \text{ after mixing}})/T_{25 \to 35^\circ C. \text{ after mixing}} \times 100\% \quad \text{(formula 1)}$$

In this formula $T_{\to 35^\circ C.}$ (which also might be represented by $T_{gel}$) represents, as mentioned above, the time lapsed in the curing phase of the resin to increase in temperature from 25° C. to 35° C. The additional reference to "at y days" shows after how many days of preparing the resin the curing is effected.

Most commonly, in the state of the art, polymerization initiation of unsaturated polyester resins, etc. by redox reactions involving peroxides, is accelerated or pre-accelerated by a cobalt compound in combination with another accelerator.

An excellent review article of M. Malik et al. in J.M.S.—Rev Macromol. Chem. Phys., C40(2&3), p. 139-165 (2000) gives a good overview of the current status of resin systems. Curing is addressed in chapter 9. For discussion of control of gel time reference can be made to the article of Cook et al. as has been mentioned above. Said article, however, does not present any hint as to the problems of gel-time drift as are being solved according to the present invention.

The phenomenon of gel-time drift, indeed, so far got quite little attention in the literature. Most attention so far has been given in literature to aspects of acceleration of gel time in general, and to improving of pot-life or shelf life of resins. The latter aspects, however, are not necessarily correlated to aspects of gel-time drift, and so, the literature until now gives very little suggestions as to possible solutions for improvement of (i.e. lowering of) gel-time drift.

Accordingly, for the unsaturated polyester resins and vinyl ester resins as are part of the current state of the art there is still need for finding resin systems showing reduced gel-time drift tendency, or in other words, resin systems having only slight gel-time drift when cured with a peroxide. Preferably the mechanical properties of the resin composition after curing with a peroxide are unaffected (or improved) as a result of the changes in the resin composition for achieving the reduced gel-time drift. Moreover, for environmental reasons, the presence of cobalt in the resins is less preferred.

The unsaturated polyester resin or vinyl ester resin as is comprised in the compositions according to the present invention, may suitably be selected from the unsaturated polyester resins or vinyl ester resin as are known to the skilled man. Examples of suitable unsaturated polyester or vinyl ester resins to be used as basic resin systems in the resins of the present invention are, subdivided in the categories as classified by Malik et al., cited above.

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

(5) Vinyl ester resins: these are resins, which are mostly used because of their hydrolytic resistance and excellent mechanical properties, as well as for their low styrene emission, are having unsaturated sites only in the terminal position, introduced by reaction of epoxy resins (e.g. diglycidyl ether of bisphenol-A, epoxies of the phenol-novolac type, or epoxies based on tetrabromobisphenol-A) with (meth)acrylic acid. Instead of (meth)acrylic acid also (meth)acrylamide may be used.

Besides these classes of resins also so-called dicyclopentadiene (DCPD) resins can be distinguished as unsaturated polyesters. As used herein, a vinyl ester resin is a (meth)acrylate functional resin. Besides the vinyl ester resins as described in Malik et al., also the class of vinyl ester urethane resins (also referred to urethane methacylate resins) can be distinguished as vinyl ester resins. Preferably, the vinyl ester used in the present invention is a resin obtained by the esterification of an epoxy resin with (meth)acrylic acid or (meth)acrylamide.

All of these resins, as can suitably be used in the context of the present invention, may be modified according to methods known to the skilled man, e.g. for achieving lower acid number, hydroxyl number or anhydride number, or for becoming more flexible due to insertion of flexible units in the backbone, etc. The class of DCPD-resins is obtained either by modification of any of the above resin types by Diels-Alder reaction with cyclopentadiene, or they are obtained alternatively by first reacting maleic acid with dicyclopentadiene, followed by the resin manufacture as shown above.

Of course, also other reactive groups curable by reaction with peroxides may be present in the resins, for instance reactive groups derived from itaconic acid, citraconic acid and allylic groups, etc. Accordingly, the unsaturated polyester resins or vinyl ester resins used in the present invention may contain solvents. The solvents may be inert to the resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam.

The unsaturated polyester resins and vinyl ester resins as are being used in the context of the present invention may be any type of such resins, but preferably are chosen from the group of DCPD-resins, iso-phthalic resins and ortho-phthalic resins and vinyl ester resins. More detailed examples of resins belonging to such groups of resins have been shown in the foregoing part of the specification. More preferably, the resin is an unsaturated polyester resin preferably chosen from the group of DCPD-resins, iso-phthalic resins and ortho-phthalic resins.

The resin composition of the two-component composition according to the present invention generally contains less than 5 wt. % water.

The inventors have surprisingly found that an efficient curing with low amounts of heterocyclic aromatic amine, preferably according to formula (1) can be obtained

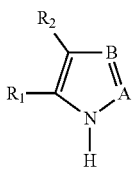

(1)

In which A=N, CR; B=N, CR; and at least one of A and B is N; R, $R_1$, $R_2$=$C_1$-$C_{20}$ alkyl, $C_6$-$C_{20}$ aryl, $C_7$-$C_{20}$ alkylaryl, $C_7$-$C_{20}$ arylalkyl in which the aryl groups can be further substituted and in which a ring structure can be formed between $R_1$ and $R_2$, $R_1$ and R, $R_2$ and R and/or $R_1$, $R_2$ and R. As examples of resulting ring structures, benzene, cyclic alkenes can be envisaged.

The amount of heterocyclic aromatic amine preferably lies between 0.001 and 1000 mmol/kg primary resin system, more preferably between 0.1 and 100 most preferably between 1 and 50 mmol/kg primary resin system.

The most preferred heterocyclic aromatic amines are imidazole, pyrazole and 1,2,3-triazolopyridine or derivatives thereof. Imidazole and its derivatives are especially preferred, being a very active co-accelerator at low amount by weight.

The soluble copper compound may be any copper compound which is soluble in the primary resin system at room temperature. In the light of solubility of the copper compound in the primary resin system, the copper compound is preferably a copper salt, more preferably the copper salt is a copper carboxylate. It will be clear that, instead of a single copper compound also a mixture of copper compounds can be used. Preferably, the soluble copper compound is an organic copper compound.

The resin composition according to the present invention comprises soluble copper compound and heterocyclic aromatic amines in such an amount that an effective curing takes place.

Preferably, the amount of the soluble copper compound lies between 0.001 and 2000 mmol/kg primary resin system, more preferably between 0.1 and 200 and even more preferably between 1 and 100 mmol/kg primary resin system.

The copper is more preferably present in the resin composition in an amount of at least 20 ppm (relative to the primary resin system) (0.3 mmol Cu per kg of primary resin system), preferably in an amount of at least 60 ppm Cu. The upper limit of the copper content is not very critical, although for reasons of cost efficiency of course no extremely high concentrations will be applied. Generally the concentration of the copper compound in the primary resin system will be such that the copper is present in an amount lower than 2000 ppm Cu (relative to the primary resin system) (31 mmol Cu per kg of primary resin system), preferably lower than 1000 ppm Cu.

For understanding of the invention, and for proper assessment of the amounts of copper compound and heterocyclic aromatic amine to be present in the resin composition, the term "primary resin system" as used herein is understood to mean the total weight of the resin, but excluding any fillers as may be used when applying the resin system for its intended uses. The primary resin system therefore consists of the unsaturated polyester resin or vinyl ester resin, any additives present therein (except for the peroxide component that is to be added shortly before the curing) soluble in the resin, such as accelerators, promoters, inhibitors, low-profile agents, colorants (dyes), thixotropic agents, release agents etc., as well as styrene and/or other solvents as may usually be present therein. The amount of additives soluble in the resin usually may be as from 1 to 25 wt. % of the primary resin system; the amount of styrene and/or other solvent may be as large as up to 50 wt. % of the primary resin system. The primary resin system, however, explicitly does not include compounds not being soluble therein, such as fillers (e.g. glass or carbon fibers), talc, clay, solid pigments (such as, for instance, titanium dioxide (titanium white)), flame retardants, e.g. aluminum oxide hydrates, etc.

The molar ratio between the soluble copper compound to heterocyclic aromatic amine is preferably between 0.5 and 50, more preferably between 1 and 10.

The inventors have further found that the curing can be performed even more efficient when the resin composition further comprises a 1,3-dioxo compound. An advantage of the presence of a 1,3-dioxo compound is that the curing is faster.

The 1,3-dioxo compound is preferably a compound having the following formula:

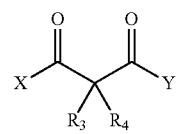

(2)

whereby
X,Y=H, $C_1$-$C_{20}$ alkyl, $C_6$-$C_{20}$ aryl, $C_7$-$C_{20}$ alkylaryl, $C_7$-$C_{20}$ arylalkyl, part of a polymer chain, $OR_5$, $NR_5R_6$;
$R_3$, $R_4$, $R_5$, and $R_6$ each individually may represent hydrogen (H), or a $C_1$-$C_{20}$ alkyl, $C_6$-$C_{20}$ aryl, $C_7$-$C_{20}$ alkylaryl or $C_7$-$C_{20}$ arylalkyl group, that each optionally may contain one or more hetero-atoms (e.g. oxygen, phosphor, nitrogen or sulphur atoms) and/or substituents;
a ring may be present between $R_3$ and $R_4$, $R_3$ and $R_5$, and/or between $R_4$ and $R_6$;
$R_5$ and/or $R_6$ may be part of a polymer chain, may be attached to a polymer chain or may contain a polymerizable group. In one embodiment, X and/or Y are/is $C_1$-$C_{20}$ alkyl and/or $C_6$-$C_{20}$ aryl. Preferably, X and/or Y are/is a methyl group. Preferably, the 1,3-dioxo compound is acetylaceton. In another and more preferred embodiment X and/or Y are/is $NR_5R_6$. The 1,3-dioxo compound may be a polymer or is polymerizable.

Preferably, the 1,3-dioxo compound is acetoacetamide as the presence of acetoacetamides in the resin composition of the present invention results in faster curing.

Preferably, the amount of the 1,3-dioxo compound is from 0.05 to 5% by weight, calculated on the total weight of the primary resin system of the resin composition. More preferably, amount of the 1,3-dioxo compound is from 0.5 to 2% by weight.

The 1,3-dioxo compound is preferably selected from the group of 1,3-diketones, 1,3-dialdehydes, 1,3-ketoaldehydes, 1,3-ketoesters, and 1,3-ketoamides.

In a further preferred embodiment of the present invention, the resin composition also contains one or more radical inhibitors. More preferably, the resin compositions according to the invention contain one or more radical inhibitors preferably chosen from the group of phenolic compounds, stable radicals like galvinoxyl and N-oxyl based compounds, benzoquinones, catechols and/or phenothiazines.

The amount of radical inhibitor as used in the context of the present invention, may, however, vary within rather wide ranges, and may be chosen as a first indication of the gel time as is desired to be achieved. Preferably, the amount of phenolic inhibitor is from about 0.001 to 35 mmol per kg of primary resin system, and more preferably it amounts to more than 0.01, most preferably more than 0.1 mmol per kg of primary resin system. The skilled man quite easily can assess, in dependence of the type of inhibitor selected, which amount thereof leads to good results according to the invention.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminum-N-nitrosophenyl hydroxylamine, diethylhydroxylamine, phenothiazine and/or derivatives or combinations of any of these compounds. Preferably, the inhibitor is selected from the group of phenothiazines, phenols, hydroquinones, benzoquinones, catechols and N-oxyl compounds.

Advantageously, the amount of radical inhibitor in the resin composition according to the invention is in the range of from 0.0001 to 10% by weight, calculated on the total weight of the primary resin system of the resin composition. More preferably, the amount of radical inhibitor in the resin composition is in the range of from 0.001 to 1% by weight.

The resin compositions according to the invention preferably further comprises one or more reactive diluents, preferably in an amount of at least 5 weight % and generally at most 80 wt. %. Such reactive diluents are especially relevant for reducing the viscosity of the resin in order to improve the resin handling properties, particularly for being used in techniques like vacuum injection, etc. However, the amount of such reactive diluent in the resin composition according to the invention is not critical. Examples of suitable reactive diluents are styrene, vinyl toluene, α-methyl styrene, tert butyl styrene, methyl methacrylate (MMA), hydroxyethyl methacrylate (HEMA), hydroxypropyl methacrylate (HPMA), vinyl ethers, vinyl esters, butanediol dimethacrylate (BDDMA), triethylene glycol dimethacrylate (TEGDMA), trimethylolpropane trimethacryate (TMPTMA), phenoxyethyl methacrylate (PEMA), N-vinylpyrrolidone and N-vinylcaprolactam. Preferably, the reactive diluent is a methacrylate and/or styrene.

The present invention further relates to a two-component composition comprising a first component A and a second component B, wherein the first component being a resin composition as described above and the second component comprises a peroxide compound.

The peroxides used for the B component can be any peroxide known to the skilled man. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc. The peroxides can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones, being an addition product of hydrogen peroxide and a ketone, such as, for instance, methyl ethyl ketone peroxide and acetylacetone peroxide), peroxyesters or peracids (such as, for instance, t-butyl peresters, benzoyl peroxide, peracetates and perbenzoates, lauryl peroxide, including (di)peroxyesters), perethers (such as, for instance, peroxy diethyl ether). Often the organic peroxides used as curing agent are tertiary peresters-or tertiary hydroperoxides, i.e. peroxy compounds having tertiary carbon atoms directly united to an —OO-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule.

Preferably, the peroxide used in the B component is selected from the group comprising hydroperoxides and peresters.

The present invention further relates to a process for radically curing a resin composition, characterized in that the curing is performed starting from a two-component composition as described above. Preferably, the curing is effected at a temperature in the range of from −20 to +200° C., preferably in the range of from −20 to +100° C., and most preferably in the range of from −10 to +40° C.

It has been found that the radical curing of a two-component composition according to the invention can be effected essentially free of cobalt and even in the absence of cobalt. Essentially free of cobalt means that the cobalt concentration in the resin composition is less than 0.01 mmol cobalt per kg primary resin system.

The two component unsaturated polyester or vinyl ester resin compositions according to the present invention can be applied in all applications as are usual for such types of resins. In particular they can suitably used in closed mould applications, but they also can be applied in open mould applications. For closed mould applications it is especially important that the manufacturer of the closed mould products reliably can use the favorable polymerization characteristics of the two component resin system according to the invention. End segments where the two components unsaturated polyester resin or vinyl ester resin systems according to the present invention can be applied are also marine applications, chemical anchoring, roofing, construction, relining, pipes & tanks, flooring, windmill blades, etc. That is to say, the two component resin systems according to the invention can be used in all known uses of unsaturated polyester resins and vinyl ester resins.

Preferably the two component system according to the invention or the composition obtained by the process according to the invention is used in marine applications like boats, chemical anchoring, roofing, construction, relining, pipes & tanks, flooring, windmill blades, containers, tanks, pipes, automotive parts.

Finally, the present invention relates to objects or structural parts obtained from a two component composition as described above.

The invention is now demonstrated by means of a series of examples and comparative examples. All examples are supportive of the scope of claims. The invention, however, is not restricted to the specific embodiments as shown in the examples.

Experimental Part

The resins used for curing are commercially available products from DSM Composite Resins B. V., Schaffhausen, Switzerland, and and in addition thereto also a resin—hereinafter referred to as Resin A—was specifically prepared on behalf of the inventors for being used in the tests. The peroxides used for curing are commercially available products from Akzo Nobel Inc.

Preparation of Resin A 184.8 g of propylene glycol (PG), 135.8 g of diethylene glycol (DEG), 216.1 g of phthalic anhydride (PAN), 172.8 g of maleic anhydride (MAN), and 0.075 g 2-t-butylhydroquinone were charged in a vessel equipped with a reflux condenser, a temperature measurement device and inert gas inlet. The mixture was heated slowly by usual methods to 205° C. At 205° C. the mixture was kept under reduced pressure until the acid value reached a value below 16 mg KOH/g resin and the falling ball viscosity at 100° C. was below 50 dPa·s. Then the vacuum was relieved with inert gas, and the mixture was cooled down to 130° C., and thereafter the solid UP resin so obtained was transferred to a mixture of 355 g of styrene and 0.07 g of mono-t-butyl-hydroquinone and was dissolved at a temperature below 80° C. The final resin viscosity reached at 23° C. was 640 mPa·s, and the Non Volatile Matter content was 64.5 wt. %.

Monitoring of Curing

In most of the Examples and Comparative Examples presented hereinafter it is mentioned, that curing was monitored by means of standard gel time equipment. This is intended to mean that both the gel time ($T_{gel}$ or $T_{25 \to 35° C.}$) and peak time ($T_{peak}$ or $T_{25 \to peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

For some of the Examples and Comparative Examples also the gel-time drift (Gtd) was calculated. This was done on the basis of the gel times determined at different dates of curing according to formula 1:

$$\text{Gtd} = (T_{25 \to 35° C. \text{ at } y\text{-days}} - T_{25 \to 35° C. \text{ after mixing}}) / T_{25 \to 35° C. \text{ after mixing}} \times 100\% \quad \text{(formula 1)}$$

with "y" indicating the number of days after mixing.

Examples 1-2 and Comparative Examples A-D

Formulations were prepared based on 90 g resin A combined with 10 g styrene, 0.24 g Cu naphtenate in spirits (8% Cu) and various amounts of amines. Curing was performed employing 3% Butanox M50.

The cure was monitored using the gel time equipment described above and the results are shown in table 1.

TABLE 1

| ex | amine | Amount (g) | Tgel (min) | T peak (min) | Temp ° C. |
|---|---|---|---|---|---|
| 1 | imidazole | 0.035 | 10.9 | 18.4 | 181 |
|   |   | 0.067 | 12.8 | 20.5 | 180 |
| 2 | pyridine | 0.035 | 32.4 | 47.8 | 135 |
|   |   | 0.067 | 23.2 | 35.5 | 146 |
| Comp A | morpholine | 0.035 | 211.4 | 240.6 | 118 |
|   |   | 0.067 | 110.3 | 121.4 | 118 |
| Comp B | N,N-dimethyl ethanolamine | 0.035 | 177 | 211.6 | 38 |
|   |   | 0.067 | 109.7 | 153.6 | 53 |
| Comp C | triethylamine | 0.035 | — | 320.7 | 33 |
|   |   | 0.067 | 125.1 | 170.4 | 73 |
| Comp D | aniline | 0.035 | — | 829.7 | 28 |
|   |   | 0.067 | — | 733.9 | 28 |

These examples demonstrate that efficient curing with low amounts of amine only takes place when employing heterocyclic aromatic amines according to the invention.

Examples 3-9

Formulations were prepared based on 90 g resin A combined with 10 g styrene, 0.24 g Cu naphtenate in spirits (8% Cu) and various amounts of heterocyclic aromatic amines. Curing was performed employing 3% Butanox M50.

The cure was monitored using the gel time equipment described above and the results are shown in table 2.

TABLE 2

Gel times with various amounts of various amines

| Ex | amine | 5 mmol amine/ kg resin | 50 mmol amine/kg resin | 100 mmol amine/kg resin |
|---|---|---|---|---|
| 3 | Imidazole | 9.6 | 37.6 | 41.6 |
| 4 | Pyrazole | 36.8 | 118 | 142.8 |
| 5 | 1,2,3-triazolo pyridine | 10.4 | 16.8 | 20 |
| 6 | pyridine | 31.5 | 28 | 34 |
| 7 | pyridazine | 74 | 10 | 7 |
| 8 | oxazole | 140 | 83 | 90 |
| 9 | 1,2,4-triazolo pyrimidine | 94 | 14 | 6.5 |

These results indicate that with low amounts of aromatic heterocyclic amines i.e. in the range of 0.3% a sufficient curing can be obtained. Furthermore these results clearly show that using imidazole, pyrazole and 1,2,3-triazolo pyridine, i.e. structures according to formula 1 even at 5 mmol/kg resin e.g. amounts in the range of 0.03% an efficient curing takes place.

Examples 10-11

Formulations were prepared based on 100 g of Daron XP 45-A-2, different amounts of Cu naphtenate in spirits (8% Cu) and different amounts of imidazole. Curing was performed employing 2% Butanox M50. The cure was monitored using the gel time equipment described above and the results are shown in table 3.

TABLE 3

| ex | Copper 8% (g) | Amount of copper (ppm) | Imidazole (g) | Tgel (min) | T peak (min) | Temp ° C. |
|---|---|---|---|---|---|---|
| 10 | 0.0375 | 30 | 0.0064 | 119.2 | 145.9 | 88 |
| 11 | 1.2501 | 1000 | 0.2143 | 26.6 | 38.2 | 135 |

These examples demonstrate that with a similar ratio of copper-imidazole, low and high amounts of copper can be used for curing a resin.

Examples 12-14

Formulations were prepared based on 90 g resin A combined with 10 g styrene, 0.24 g Cu naphtenate in spirits (8% Cu) and 0.04 g imidazole. Curing was performed employing 3% of various peroxides. The cure was monitored using the gel time equipment described above and the results are shown in table 4.

TABLE 4

| Ex | peroxide | Tgel (min) | T peak (min) | Temp ° C. |
|---|---|---|---|---|
| 12 | Butanox M50 | 10 | 18 | 176 |
| 13 | Trigonox 44B | 48 | 59 | 164 |
| 14 | Cyclonox LE50 | 8 | 12 | 123 |

These experiments clearly demonstrate that various peroxides can be employed with the accelerator system according to the invention.

Examples 15-18

Formulations were prepared based on 100 g of various resin systems, 0.23 g Cu naphtenate in spirits (8% Cu) and 0.04 g imidazole. Curing was performed employing 3% Butanox M50. The cure was monitored using the gel time equipment described above and the results are shown in table 5.

TABLE 5

| ex | resin | Tgel (min) | T peak (min) | Temp ° C. |
|---|---|---|---|---|
| 15 | A/styrene (90/10) | 11.4 | 20 | 170 |
| 16 | Palatal P69-02/styrene (90/10 | 49.7 | 67.6 | 147 |
| 17 | Palatal P6-01/styrene (90/10) | 141.1 | 160 | 144 |
| 18 | Daron-XP45-A2 | 62.5 | 73.7 | 156 |

These examples clearly demonstrate that various resins can be used.

Examples 19-20

Formulations were prepared based on 90 g of various resin in 10 g styrene, 0.23 g Cu naphtenate in spirits (8% Cu), 0.04 g imidazole and 0.01 g t-butylcatechol. Curing was performed employing 3% Butanox M50. The cure was monitored using the gel time equipment described above and the results are shown in table 6.

TABLE 6

| ex | Resin | Tgel (min) | T peak (min) | Temp ° C. |
|---|---|---|---|---|
| 19 | A | 18.4 | 28.9 | 166 |
| 20 | Palatal P69-02 | 58.6 | 76.5 | 144 |

These results demonstrate that the cure characteristics can be tuned by employing inhibitors.

Example 21

A formulation was prepared based on 180 g resin A, 20 g styrene, 0.46 g Cu naphtenate (8%) and 0.08 g imidazole. After stirring the mixture for 5 minutes the mixture was dived in 2 portions of 100 g each. The first portion was cured immediately with Butanox M50 yielding similar cure characteristics as described in example 15 and the second portion was cured after 28 days of storage yielding Tgel=11.7, Tpeak=19.4 and peak temperature of 178° C. This corresponds to a gel time drift of only 3% after 28 days.

Example 22

A formulation was prepared based on 180 g Palatal P6-01, 20 g styrene, 0.46 g Cu naphtenate (8%) and 0.08 g imidazole. After stirring the mixture for 5 minutes the reactivity of the mixture was dived in 2 portions of 100 g each. The first portion was cured immediately with Butanox M50 yielding similar cure characteristics as described in example 17 and the second portion was cured after 91 days of storage yielding Tgel=139.5, Tpeak=159 and peak temperature of 140° C. This corresponds to a gel time drift of only −1% after 91 days of storage.

Examples 21 and 22 clearly demonstrate that employing the cure systems according to the invention drift free pre accelerated resins can be obtained.

Example 23

A formulation was prepared based on 100 g Palatal P4-01, 0.2 g Cu naphtenate (8%), 1 g N,N diethyl acetoacetamide and 0.03 g imidazole. After stirring the mixture for 5 minutes the reactivity of the mixture was determined with the geltimer using 2% Butanox M50: Tgel=16, Tpeak=24.9 and peaktemperature of 122° C.

Example 24

A formulation was prepared based on 100 g Synolite 8388, 0.2 g Cu naphtenate (8%), 1 g N,N diethyl acetoacetamide and 0.03 g imidazole. After stirring the mixture for 5 minutes the reactivity of the mixture was determined with the geltimer using 2% Butanox M50: Tgel=16, Tpeak=24.9 and peaktemperature of 122° C.

Example 23 and 24 demonstrate that the cure system according to the invention can be used advantageously in combination with 1,3-dioxo compounds.

Example 25

A formulation was prepared based on 90 g resin A, 10 g styrene, 0.22 g Cu naphtenate in spirits (8%), 0.04 g imidazole and 0.98 g N,N diethylacetoacetamide. After stirring for 5 min the reactivity of the mixture was determined with the geltimer using 3% Butanox M50: Tgel=7.4 min, T peak=13.8 min and peak temperature of 167° C.

From comparing example 15 with example 25 it is evident that 1.3 dioxo compounds like N,N diethylacetoacetamide make the curing more effective.

The invention claimed is:

1. A process for radically curing a resin composition, comprising the steps of:
   (a) providing a two-component composition having a first component comprised of a resin composition comprising an unsaturated polyester resin and/or a vinyl ester resin, and containing less than 0.001 mmol cobalt per kg primary resin system, and a second component comprising an organic peroxide;
   (b) subjecting the first component to peroxide curing by bringing the first and second components of the two-component composition into contact with one another, and
   (c) accelerating the peroxide curing of the resin composition of the first component by incorporating into the first component prior to step (b) an accelerator combination consisting of a soluble copper compound and a heterocyclic aromatic amine, wherein the copper compound is present in an amount between 0.001 and 2000 mmol/kg primary resin system and the heterocyclic aromatic amine is present in an amount between 0.001 and 1000 mmol/kg primary resin system sufficient to effect accelerated peroxide curing of the first component according to step (b).

2. The process according to claim 1, wherein step (b) is effected at a temperature in the range of from −20 to +200° C.

3. The process according to claim 1, wherein the heterocyclic aromatic amine is a compound according to formula 1:

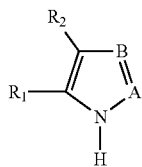

(1)

in which
each of A and B is N or CR, provided that at least one of A and B is N; and
R, $R_1$, and $R_2$ are $C_1$-$C_{20}$ alkyl, $C_6$-$C_{20}$ aryl, $C_7$-$C_{20}$ alkylaryl, or $C_7$-$C_{20}$ arylalkyl in which the aryl groups can be further substituted, and in which a ring structure can be formed between $R_1$ and $R_2$, $R_1$ and R, $R_2$ and R and/or $R_1$, $R_2$ and R.

4. The process according to claim 1, wherein the heterocyclic aromatic amine is imidazole or a derivative thereof.

5. The process according to claim 1, wherein the soluble copper compound is an organic copper compound.

6. The process according to claim 5, wherein the organic copper compound is a copper carboxylate.

7. The process according to claim 1, wherein the copper and heterocyclic aromatic amine are present in a molar ratio of copper to heterocyclic aromatic amine of between 0.5 and 50.

8. The process according to claim 1, wherein the first component further comprises an inhibitor.

9. The process according to claim 8, wherein the inhibitor is selected from the group of phenothiazines, phenols, hydroquinones, benzoquinones, catechols and N-oxyl compounds.

10. A process for pre-accelerating a resin composition comprised of an unsaturated polyester resin and/or a vinyl ester resin and containing less than 0.01 mmol cobalt per kg primary resin system, the process comprising incorporating into the resin composition an amount of an accelerator combination consisting of a soluble copper compound and a heterocyclic aromatic amine, wherein the copper compound is present in an amount between 0.001 and 2000 mmol/kg primary resin system and the heterocyclic aromatic amine is present in an amount between 0.001 and 1000 mmol/kg primary resin system sufficient to effect accelerated peroxide curing of the resin composition.

11. The process according to claim 10, wherein the heterocyclic aromatic amine is a compound according to formula 1:

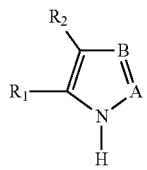

(1)

in which
each of A and B is N or CR, provided that at least one of A and B is N; and
R, $R_1$, and $R_2$ are $C_1$-$C_{20}$ alkyl, $C_6$-$C_{20}$ aryl, $C_7$-$C_{20}$ alkylaryl, or $C_7$-$C_{20}$ arylalkyl in which the aryl groups can be further substituted, and in which a ring structure can be formed between $R_1$ and $R_2$, $R_1$ and R, $R_2$ and R and/or $R_1$, $R_2$ and R.

12. The process according to claim 10, wherein the heterocyclic aromatic amine is imidazole or a derivative thereof.

13. The process according to claim 10, wherein the soluble copper compound is an organic copper compound.

14. The process according to claim 13, wherein the organic copper compound is a copper carboxylate.

15. The process according to claim 10, wherein the copper and heterocyclic aromatic amine are present in a molar ratio of copper to heterocyclic aromatic amine of between 0.5 and 50.

16. The process according to claim 10, wherein the first component further comprises an inhibitor.

17. The process according to claim 16, wherein the inhibitor is selected from the group of phenothiazines, phenols, hydroquinones, benzoquinones, catechols and N-oxyl compounds.

* * * * *